United States Patent [19]
Lee et al.

[11] Patent Number: 6,045,080
[45] Date of Patent: Apr. 4, 2000

[54] BELT TENSION VARYING APPARATUS FOR PORTABLE AUDIO LOGIC DECK

[75] Inventors: Chang-Jip Lee; Tae-won Park, both of Suwon, Rep. of Korea

[73] Assignee: Samsung Electronics Co., Ltd., Rep. of Korea

[ * ] Notice: This patent is subject to a terminal disclaimer.

[21] Appl. No.: 08/948,548

[22] Filed: Oct. 10, 1997

[30] Foreign Application Priority Data

Oct. 30, 1996 [KR] Rep. of Korea ......................... 96-50501

[51] Int. Cl.⁷ ............................. G11B 15/32; G11B 5/008
[52] U.S. Cl. ........................................ 242/356.7; 360/96.4
[58] Field of Search ............................... 242/356.7, 340, 242/354.1, 354.2; 360/96.4

[56] References Cited

U.S. PATENT DOCUMENTS 3,534,923  10/1970  Wakabayashi ...................... 242/356.7
4,359,288  11/1982  Bullock ............................. 242/356.7

*Primary Examiner*—John Q. Nguyen
*Attorney, Agent, or Firm*—Dilworth & Barrese

[57] ABSTRACT

An apparatus for varying the tension of a belt in a portable audio logic deck is provided. The belt tension varying apparatus includes a main base, a driving source installed in the main base, a pulley which transfers a driving force of the driving source while being wound by a belt and a main slide linearly reciprocating by the driving force of the driving source. A lever member is pivotably installed in the main slide and has an end portion connected to the rotational axis of the pulley. An elastic member elastically supports and biases the lever member in one direction, and a varying unit adjusts the tension of the belt wound around the pulley by pivoting the pulley, via the lever member, in response to the linear reciprocating movement of the main slide.

6 Claims, 5 Drawing Sheets

BELT TENSION VARYING APPARATUS FOR PORTABLE AUDIO LOGIC DECK

BACKGROUND

1. Field of the Invention

The present invention relates to a portable audio logic deck operated by a single driving source, and more particularly, to an apparatus for varying the tension of a belt in a portable audio logic deck.

2. Prior Art

In general, portable audio decks are divided into two groups, a manual deck having a manually-operated head, and a logic deck having an automatically-operated head. When recording on, or reproducing information from a tape cassette, the portable audio deck performs head operations, tape running and operation mode conversion with a single driving motor.

As shown in FIG. 1, a conventional portable audio logic deck includes a driving source 20 which is fixed to a main base or housing 10 and provides a rotational driving force (i.e., torque), a power transfer unit 30 which transfers the rotational force of the driving source 20, and a mode converting unit 40 which alters the mode using the transferred power. Here, the driving source 20 is formed of a single motor, and provides power to run a tape (not shown) and perform mode conversion.

The power transfer unit 30 includes a pulley 32, a pair of capstan wheels 33 and 34 rotating around a capstan axis (not shown), a main gear 35 rotating by its engagement with the capstan wheel 34, and a belt 31 which combines driving source 20, pulley 32 and the capstan wheels 33 and 34. The belt 31 is wound in an anti-rolling manner via the pulley 32 to rotate the capstan wheels 33 and 34 in opposite directions. Thus, the rotational force of the driving source 20 is transferred to the main gear 35.

The mode converting unit 40 includes a cam gear 41 having a cam groove 41a, and a main slide 43 having a hooking protrusion 43a inserted into the cam groove 41a. Cam gear 41 is selectively rotated by its interlocking engagement with main gear 35, and main slide 43 is linearly moved by the rotation of cam gear 41. The main slide 43 is kept at a stop mode position by the elastic force of a spring 45. The main slide 43 moves linearly via the rotation of the cam gear 41 to change the operating mode.

In the conventional portable audio logic deck as structured above, since the pulley 32 and the capstan wheels 33 and 34 are fixed on the main base 10, the tension of the belt 31 is not variable and a constant tension is maintained. Here, the tension of the belt 31 is set to hold the maximum load among loads generated during a forward/reverse play mode, a fast winding mode, a stop mode, and the time of mode conversion to transfer the entire power. As a result, when operating in the play mode, a smaller load is required and thus the load applied to the power transfer unit becomes greater than is needed. Such an excessive load wastes power.

SUMMARY OF THE INVENTION

To overcome the above problem, it is an objective of the present invention to provide an apparatus for varying the tension of the belt in a portable audio logic deck according to the mode of operation and thereby optimizing the load applied to the respective members to prevent unnecessary waste of power.

Accordingly, to achieve the above objective, there is provided an apparatus for varying the tension of a belt in a portable audio logic deck comprising: a main base; a driving source installed in the main base; a pulley which transfers a driving force of the driving source while being wound by a belt; a main slide linearly reciprocating by the driving force of the driving source; a lever member pivotably mounted in the main base and having an end portion to which a rotational axis of the pulley is fixed; an elastic member which elastically supports and biases the lever member in one direction; and a varying unit for adjusting the tension of the belt wound around the pulley by pivoting the lever member as the main slide linearly reciprocates.

In a preferred embodiment, the varying unit comprises an angled groove formed on the lever member and a guide protrusion formed on the main slide to insert into or separate from the angled groove according to the reciprocating motion of the main slide.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

Figure 1:
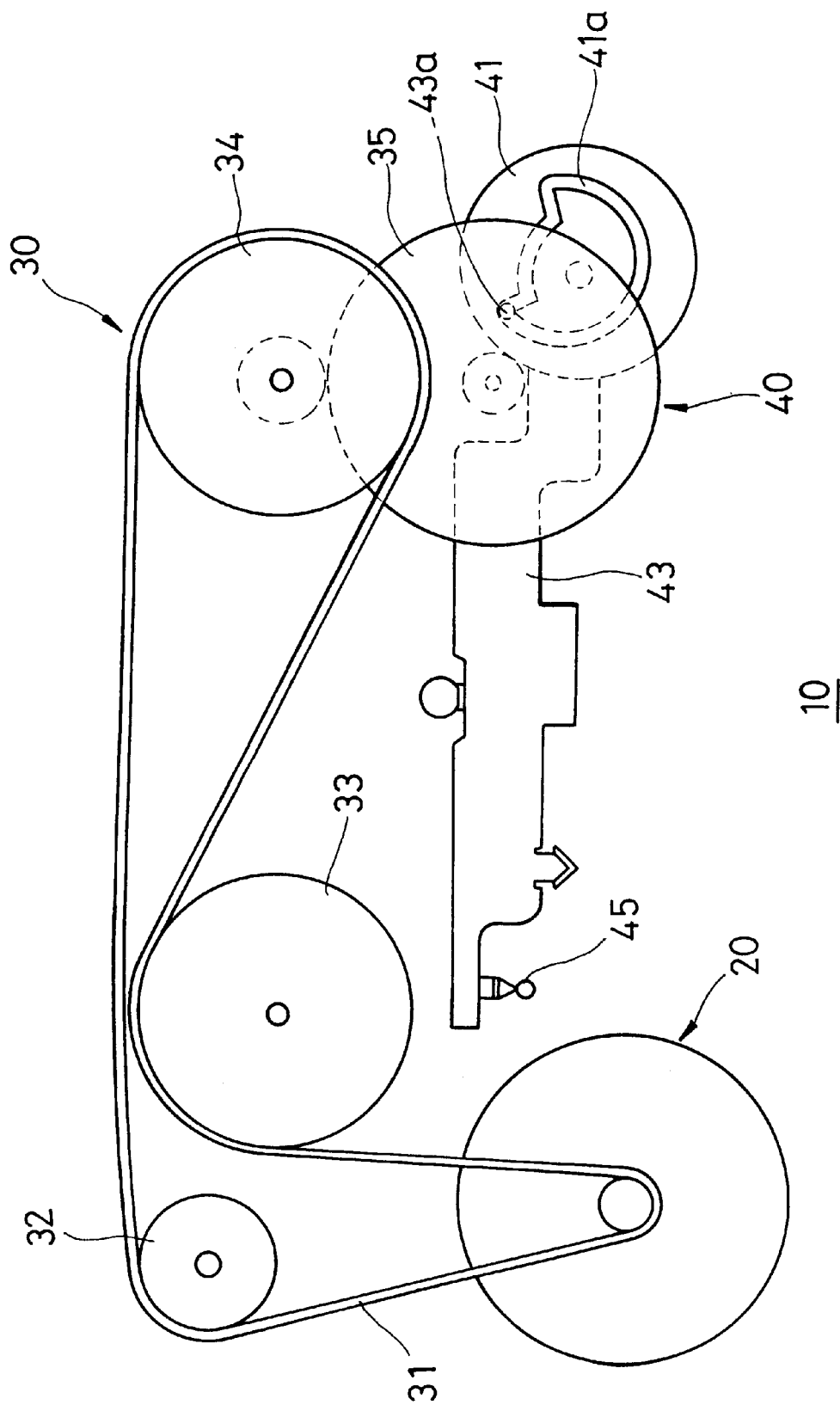
FIG. 1 is a plan view schematically illustrating a conventional portable audio logic deck.
Figure 2:
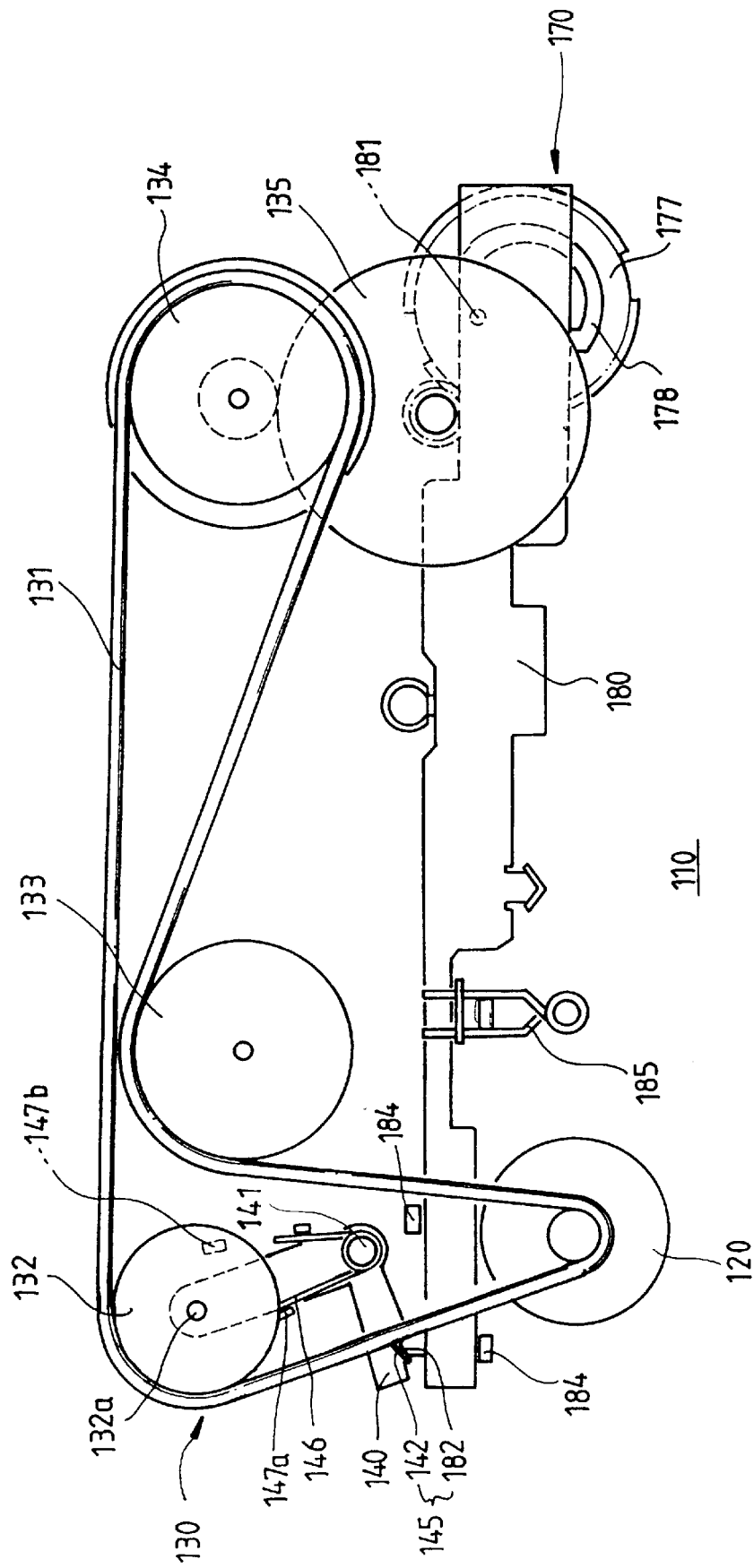
FIG. 2 is a plan view schematically illustrating an apparatus for varying the belt tension of a portable audio logic deck in a stop mode according to a preferred embodiment of the present invention.
Figure 3:
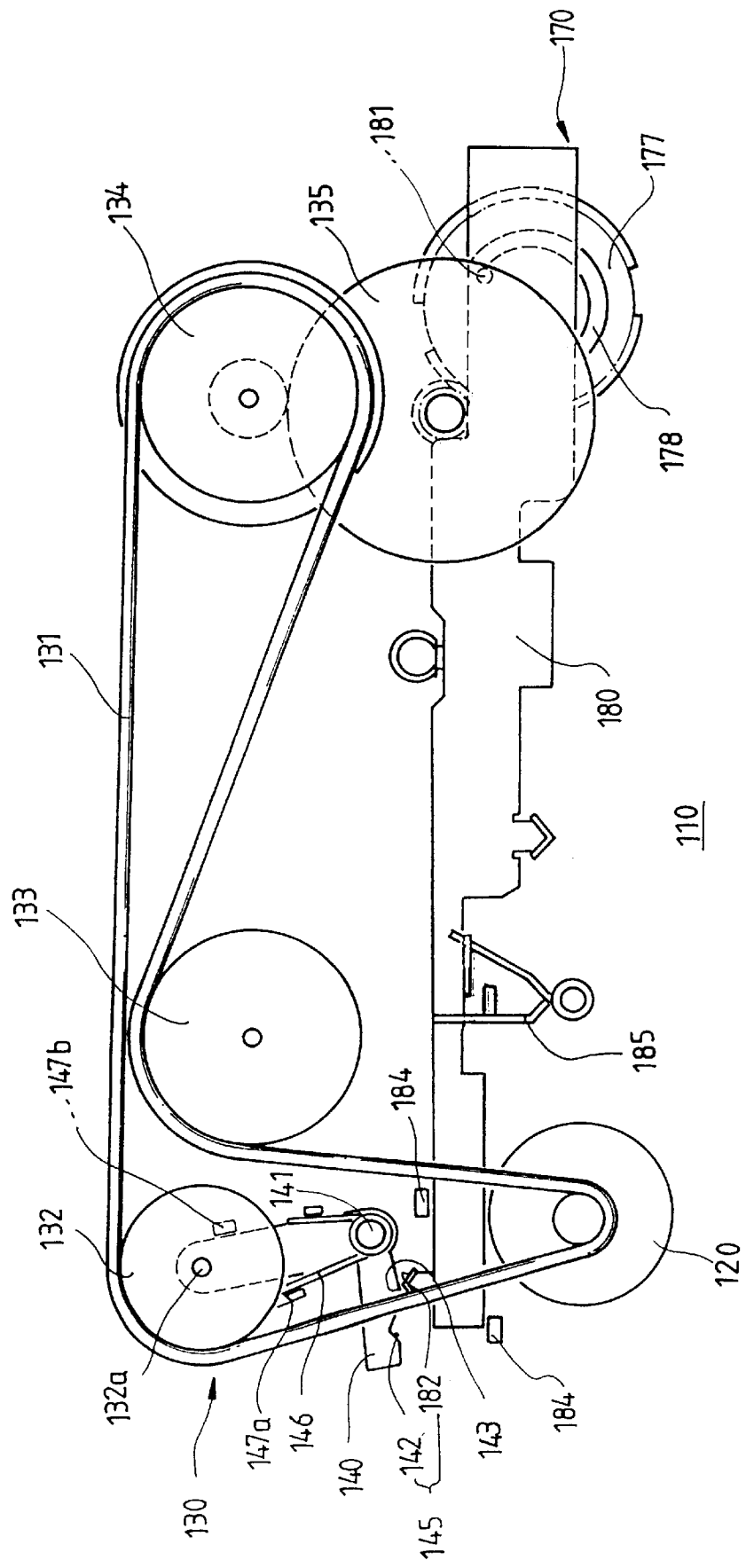
FIG. 3 is a plan view schematically illustrating the apparatus for varying the belt tension of a portable audio logic deck in a forward play mode according to a preferred embodiment of the present invention.
Figure 4:
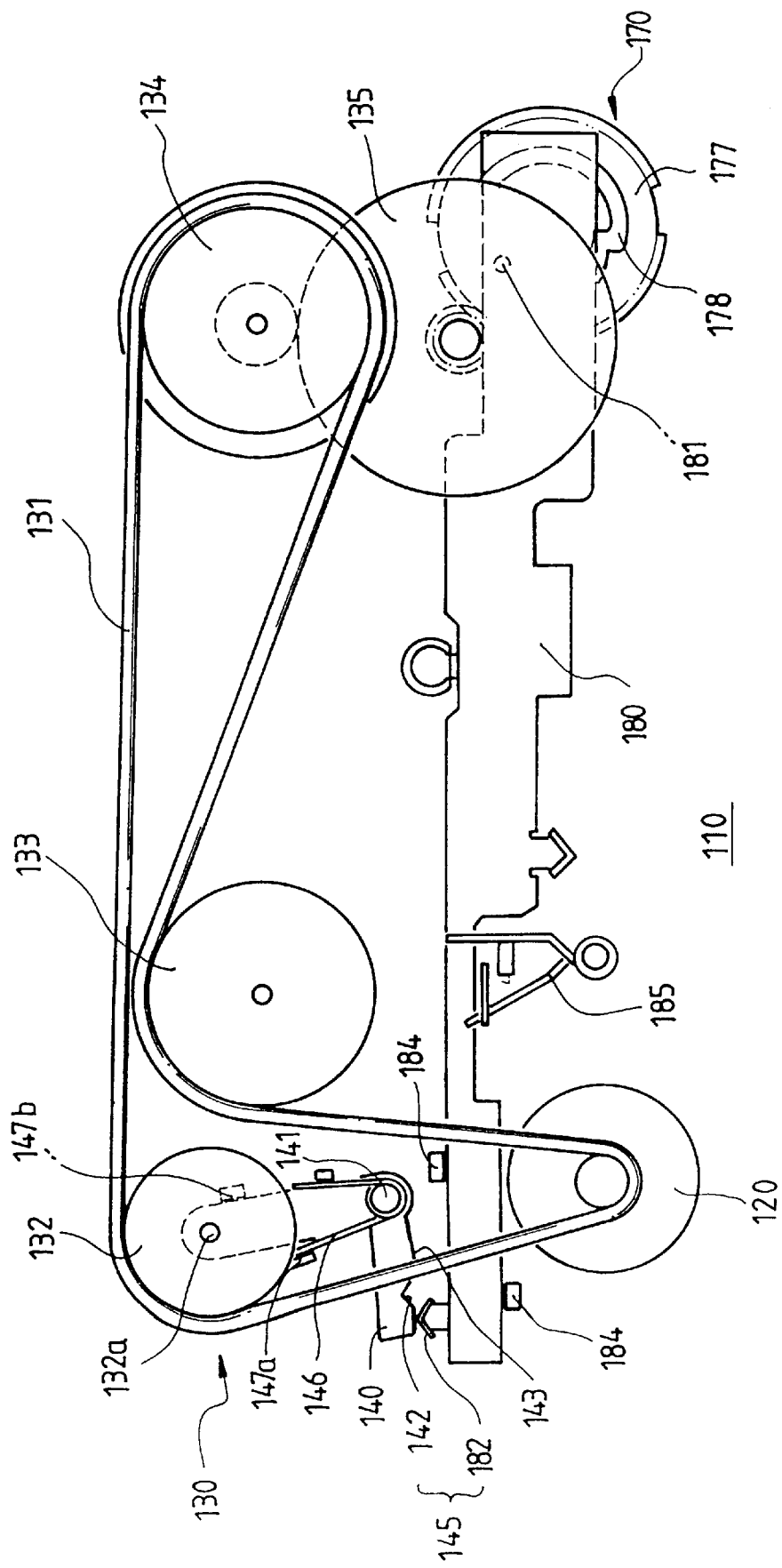
FIG. 4 is a plan view schematically illustrating the apparatus for varying the belt tension of a portable audio logic deck in a reverse play mode according to a preferred embodiment of the present invention.

Referring to FIGS. 2 through 4, a portable audio logic deck includes a main base or housing 110, a driving source 120 installed in the main base 110 for providing a rotational force, a power transfer unit 130 for transferring the rotational force of the driving source 120, and a mode converting unit 170 for converting the operating mode by varying the power transferred by the power transfer unit 130. Power transfer unit 130 includes a pulley 132, a pair of capstan wheels 133 and 134 rotating around a capstan axis (not shown), a main gear 135 being interlocked with and rotated by the capstan wheel 134, and a belt 131 which combines the driving source 120, the pulley 132 and the capstan wheels 133 and 134. Thus, the rotational force of the driving source 120 is transferred to the main gear 135.

The mode converting unit 170 includes a cam gear 177 having a cam groove 178. Cam gear 177 is selectively rotated by its interlocking engagement with the main gear 135, and a main slide 180 includes a hooking protrusion 181 inserted into the cam groove 178 enabling the linear movement of slide 180 by the rotation of cam gear 177. The main slide 180 is kept at a stop mode position by the elastic force of a spring 185, and includes an end portion thereof protruding above the driving source 120 to accommodate the installation of a belt tension varying apparatus which will be described below.

The belt tension varying apparatus according to a preferred embodiment of the present invention includes a lever member 140 pivotably installed in the main base 110 to pivot by being selectively interlocked with the main slide 180, an elastic member 146 elastically supporting and biasing the lever member 140, and a varying unit 145 for pivoting the lever member 140.

A rotational axis 132a of pulley 132 is rotatably installed at one end of the lever member 140, and the rotational axis 141 of lever member 140 is fixed to the main base 110. Thus, the rotational axis 132a of pulley 132 can be finely adjusted or moved by the movement of the lever member 140.

The elastic member 146 elastically biases the lever member 140 in one direction. It is preferable that the elastic member 146 is a torsion coil spring in which one end is coupled to lever member 140 and the other end is coupled to main base 110. Accordingly, when the rotational force applied to lever member 140 by the varying unit 145 is removed, the loosening of pulley 132 is prevented. Stoppers 147a and 147b for restricting the range of pivoting movement of lever member 140 protrude from main base 110.

Figure 5:
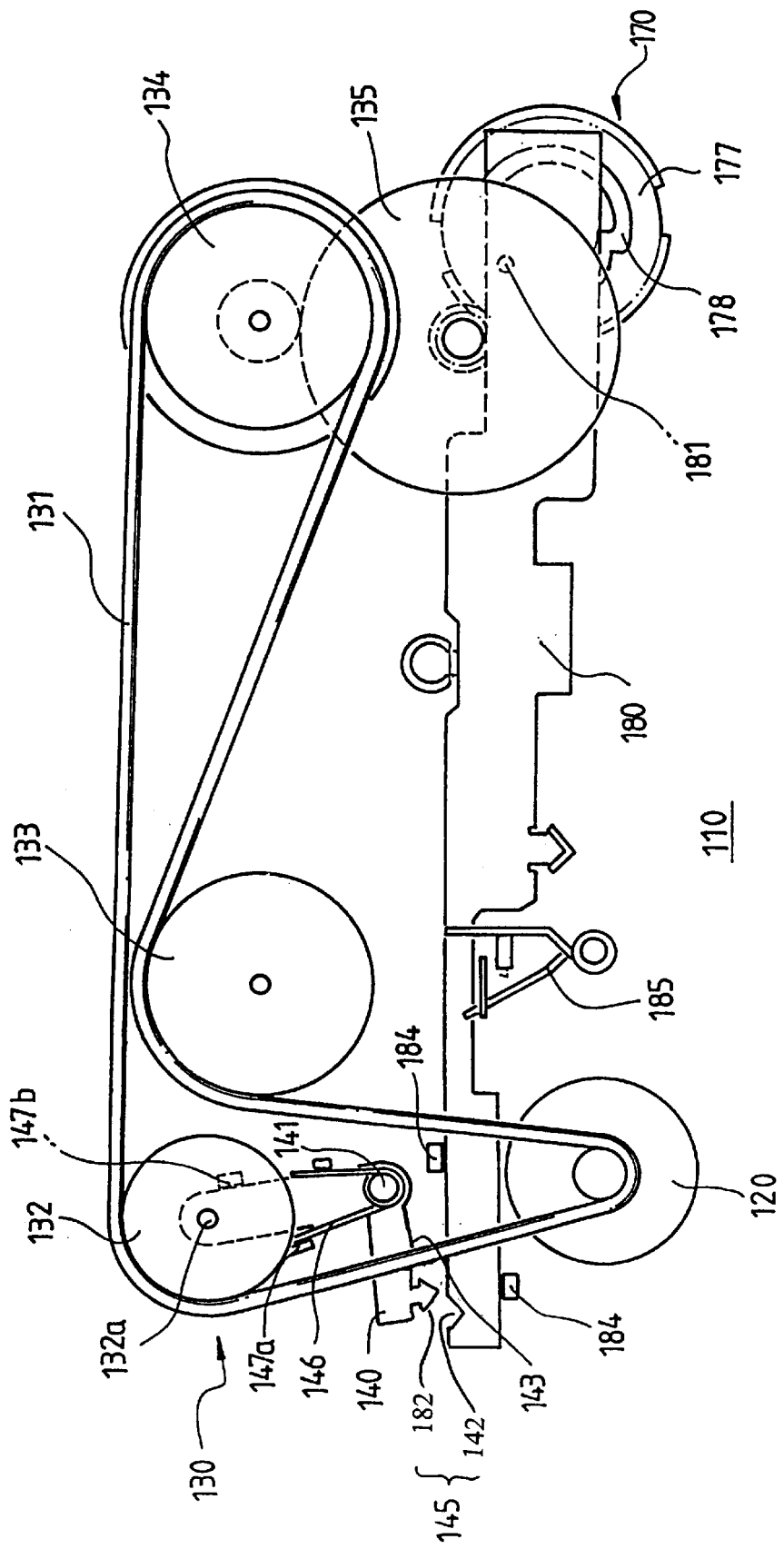
FIG. 5 is a plan view schematically illustrating the apparatus for varying the belt tension of a portable audio logic deck in a reverse play mode according to another embodiment of the invention.

The varying unit 145 converts the reciprocating movement of main slide 180 into a pivoting movement of lever member 140. The varying unit 145 includes an angled groove 142 formed on lever member 140 and a guide protrusion 182 formed on main slide 180. Guide protrusion 182 selectively engages angled groove 142 by inserting into and separating therefrom. Alternatively, the angled groove and the guide protrusion corresponding thereto can be formed on the main slide 180 and the lever member 140, respectively (See FIG. 5).

Also, it is preferred that guide bars 184 for preventing the main slide 180 from pivoting and for guiding the linear movement of the main slide 180 are formed on the main base 110.

In a stop mode, as shown in FIG. 2, the guide protrusion 182 fits into the angled groove 142 and thereby prevents lever member 140 from pivoting. Here, the tension of the belt 131 is appropriate for converting the stop mode into another mode.

In a forward and reverse play mode, as shown respectively in FIGS. 3 and 4, the guide protrusion 182 is separated from the angled groove 142, as the main slide 180 reciprocates, and contacts the lower portion of lever member 140 to finely pivot lever member 140. Thus, the tension of the belt 131 can be adjusted appropriately for the forward/reverse play mode.

As described above, the apparatus for varying the belt tension of a portable audio logic deck having the above structure according to the present invention varies the position of the pulley 132 according to a stop mode or a play mode. By varying the tension applied to the belt, power consumption of the deck is reduced.

It is noted that the present invention is not limited to the preferred embodiment described above, and it is apparent that variations and modifications by those skilled in the art can be effected within the spirit and scope of the present invention defined in the appended claims.

What is claimed is:

1. An apparatus for varying the tension of a belt in a portable audio logic deck comprising:

a main base;

a driving source installed in said main base and having a driving force;

a belt connected to said driving source for transferring said driving force;

a pulley being wound by the belt and having a rotational axis, said pulley transferring the driving force of said driving source;

a main slide slidably disposed in said main base, adapted to be driven by the driving force, and having a linear reciprocating motion generated in response to the transferred driving force;

a lever member pivotably installed in said main base and having an end portion connected to the rotational axis of said pulley so that said pulley pivots with said lever member;

an elastic member for supporting and biasing said lever member in one direction; and a varying unit attached to an end portion of said main slide and adapted for converting a linear reciprocating motion of said main slide into a pivoting movement of said lever member, said pivoting movement of said lever member causing a change of the tension of the belt wound around said pulley, said varying unit comprising an angled groove formed in said main slide, and a guide protrusion formed on said lever member to selectively engage said angled groove according to the linear reciprocating motion of said main slide.

2. An apparatus for varying the tension of a belt as claimed in claim 1, further comprising a stopper formed on said main base to restrict the pivotal movement of said lever member.

3. An apparatus for varying the tension of a belt as claimed in claim 2, further comprising a guide bar formed on said main base to guide the reciprocating motion of said main slide.

4. An apparatus for varying the tension of a belt in a portable audio logic deck comprising:

a main base;

a driving source installed in said main base and having a driving force;

a belt connected to said driving source for transferring said driving force;

a pulley being wound by the belt and having a rotational axis, said pulley being coupled to said driving force via the belt;

a main slide slidably disposed in said main base, adapted to be driven by the driving force, and having a linear reciprocating motion generated in response to the transferred driving force;

a lever member pivotably installed in said main base and having an end portion connected to the rotational axis of said pulley so that said pulley pivots with said lever member;

an elastic member for supporting and biasing said lever member in one direction; and a varying unit attached to an end portion of said main slide and adapted for converting a linear reciprocating motion of said main slide into a pivoting movement of said lever member, said pivoting movement of said lever member causing a change of the tension of the belt wound around said pulley, said varying unit comprising an angled groove formed in said main slide, and a guide protrusion formed on said lever member to selectively engage said angled groove according to the linear reciprocating motion of said main slide.

5. An apparatus for varying the tension of a belt as claimed in claim 4, further comprising a stopper formed on said main base to restrict the pivotal movement of said lever member.

6. An apparatus for varying the tension of a belt as claimed in claim 5, further comprising a guide bar formed on said main base to guide the linear reciprocating motion of said main slide.

* * * * *